UNITED STATES PATENT OFFICE 2,656,863

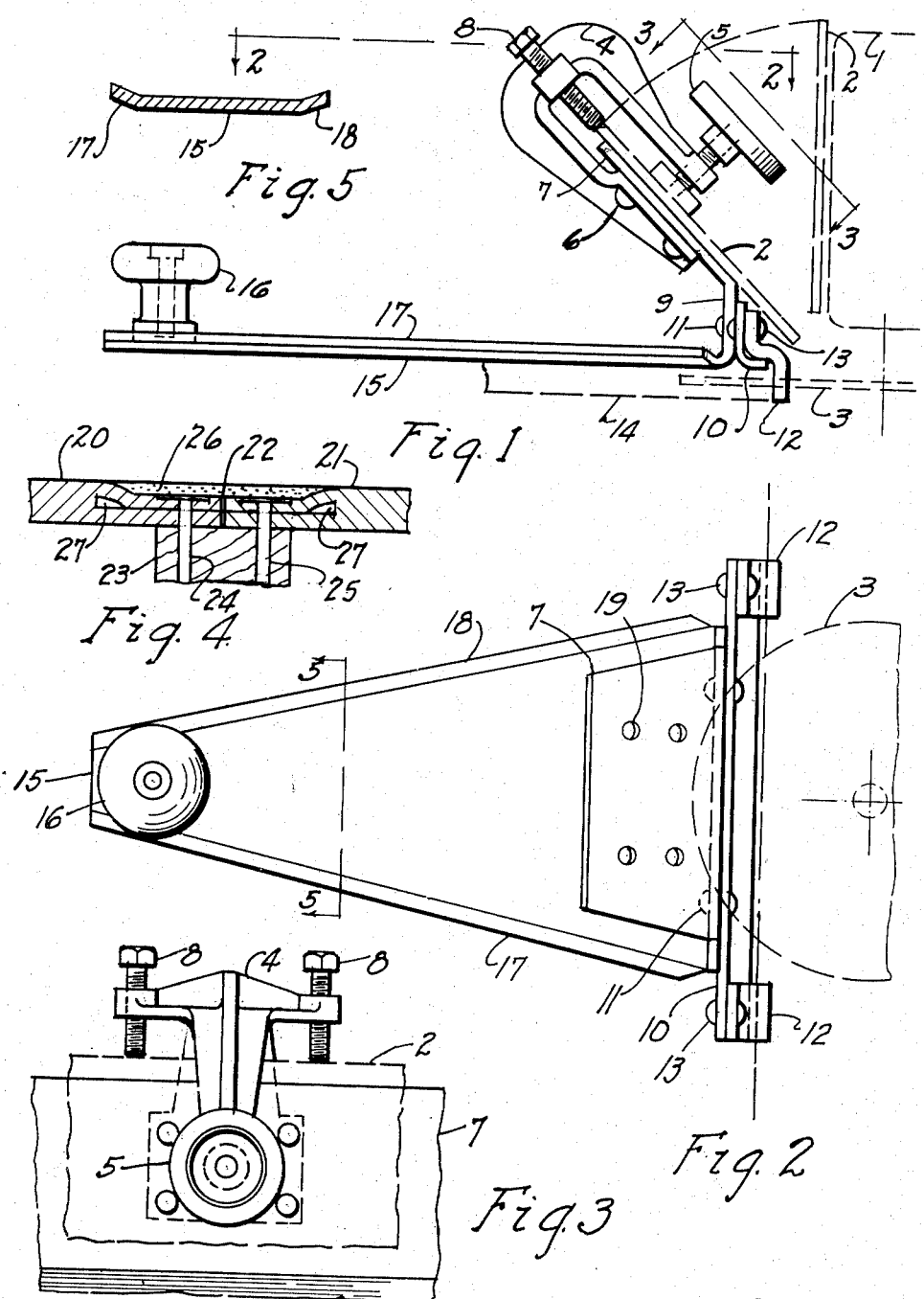

PANEL EDGE GROOVING ATTACHMENT FOR ELECTRIC HANDSAWS

George H. Bugenhagen, Minot, N. Dak.

Application January 30, 1950, Serial No. 141,282

3 Claims. (Cl. 144—136)

The invention relates to an improvement in electric hand saws and more particularly concerns an attachment for electric hand saws rendering the tool suitable for use in grooving the edges of gypsum board, plywood, and other construction materials of this nature.

In the operation of assembling manufactured sectional building board materials, such as gypsum board, plywood and the like, the point of juncture of two freshly cut sections affords a problem as regards the provision of a smooth joint which when later painted, papered or the like will not show the joint lines and thus detract from the appearance of the finished surface. It is therefore desirable to provide a means of treating such building board materials so that assembly will provide a depression or groove at the joint line which may be filled as with a plastic material and later smoothed to provide a concealed joint line.

An object of the invention is to provide a device which may be readily attached to a conventional electric hand saw to render the equipment suitable for producing a groove in the edge face of manufactured building board materials, such as gypsum board, and the like.

Another object of the invention is to provide an adjustable edge face grooving attachment for electric hand saws such that the location of the groove in the edge face is susceptible of control.

A further object of the invention is to provide an attachment for electric hand saws that is susceptible of ready and rapid attachment and detachment so that the saw can be readily converted to normal usage or to the special grooving operation.

Another object of the invention is to provide a method of accurately positioning a longitudinal groove in the edge face of manufactured building board materials whereby during assembly and fastening down of the abutted edges a depression is produced that lends itself to a filling and smoothing operation to produce a uniform and continuous surface over the abutted joints.

Other objects and advantages will appear during the course of the following description, which, taken in connection with the annexed drawings sets forth in detail certain means illustrating, however but one of the various ways in which the principle of the invention may be used.

In the drawings:

Fig. 1 is a side elevation of the device attached to an electric hand saw; the latter being shown diagrammatically.

Fig. 2 is a plan view along lines 2—2 of Fig. 1 looking in the direction of the arrows.

Fig. 3 is a view along lines 3—3 of Fig. 1 as viewed in the direction of the arrows.

Fig. 4 is a fragmentary sectional end view along the joint line of two gypsum boards showing the resulting structure provided by treating building board materials with an electric hand saw equipped with the device of the invention.

Fig. 5 is a view along lines 5—5 of Fig. 2 and shows the cross sectional shape of the attachment shoe.

Referring to Fig. 1 the motor 1 of the electric hand saw, the adjustable saw base 2, and the saw or cut-off wheel 3 are shown diagrammatically in dotted lines. Adjustable base 2 which is ordinarily pushed along the surface of the material being cut is shown in dotted lines in two positions and in the position tilted at 45 degrees with the saw blade 3 is adapted to receive the grooving attachment. The grooving attachment comprises a U-shaped clamping arm 4 threaded at one end to receive hand clamping screw 5 which suitable engages base 2 of the saw. The other end of clamping arm 4 is attached as by rivets 6 to plate member 7 against which the base 2 of the electric hand saw rides. Spaced adjusting screws 8 (see Fig. 3) are provided in clamping arm 4 for accurately positioning the base 2 in the clamping arm and hence the actual depth of the groove the saw or cut-off wheel 3 will cut and the position of the cut in the building board in relation to the edge centerline. Plate 7 is formed in a section 9 which extends at right angles to saw or cut-off wheel 3. Section 9 carries L-shaped member 10 attached thereto as by rivets 11. L-shaped member 10 mounts guide lugs 12 (see Fig. 2) secured at either end of plate 9 as by rivets 13. The base of L-shaped member 10 is adapted to ride on the surface of the board being processed. The guide lugs 12 are adapted to engage the edge of gypsum board 14, for example, for maintaining the attachment in position as a cut is made in the edge of the board. The attachment guide shoe 15 is integral with plate member 9 and is provided with knob 16 at the left end for manual control as the saw and attachment are moved across the surface of the board. The guide shoe 14 is provided with upturned edges 17 and 18 on either edge to provide for more ready progress of the shoe 15 across the surface of the board.

In Fig. 2 the triangular shape of guide shoe 15 is shown together with the extent of the upturned edges 17 and 18, the location of guide lugs 12, and their position on L-shaped member 10. The location of holes 19 in plate 7 for attachment of clamping arm 4 as well as the shape of plate 7 are more readily seen.

In Fig. 3 the details and location of adjusting screws 8 in clamping arm 4 are more readily apparent.

Fig. 4 reveals the final assembled appearance of a gypsum board structure treated with the device of the invention. As shown gypsum board sections 20 and 21 abut at point 22 and have been secured to joist member 23 as by means of nails 24 and 25. The gypsum boards 20 and 21, by virtue of having the longitudinal grooves cut in the face of each edge, will collapse upon nailing to provide a depression along the abutting line which is filled with a plastic filling material 26 to give a smooth surface and concealed joint. The portion of the cut or groove not collapsed in each board is indicated by numeral 27.

In the sectional view of Fig. 5 the cross sectional shape of guide shoe 15 as well as the extent and shape of upturned edges 17 and 18 is shown in greater detail.

The operation of the device will be best understood from the following description utilizing the electric hand saw attachment for treating gypsum board, for example. The adjustable base 2 of the electric hand saw will be tilted at an angle of 45 degrees to the saw blade and the attachment clamped to the base in the manner shown in Fig. 1. Before clamping rigidly by means of hand clamp 5 it will be desirable to adjust screws 8 to locate the cutting blade relative to shoe 15 and hence the position of the cut in the board being processed relative to the centerline of the edge face. This adjustable feature is desirable in view of the fact that building boards such as gypsum board are made in different thicknesses and it will oftentimes be found desirable to make the cut above or below the centerline of the edge face. After suitably adjusting screws 8 to provide the cut at the desired location in the edge face of the board the clamp 5 is tightened down to hold the attachment securely to the saw base 2. Thereafter the operator will grasp the usual electric saw handle in his right hand and knob 16 in his left hand and slide the shoe 15 of the tool along the surface of the board until lugs 12 engage the edge of the board. With the saw or cut-off tool running, the shoe 15 is held in contact with the surface of the board and pushed along with lugs 12 always in contact with the edge of the board. In this manner a uniform groove is provided along the desired edge of the board which can then be assembled in the manner shown in Fig. 4. After the groove has been collapsed as by nailing a plastic filling compound may be used together with the usual reinforcing tape to provide a level continuous surface and a concealed joint line.

It will be understood that a conventional saw may be used or a resinoid bonded silicon carbide wheel depending on the particular material being worked. Among the advantages of the invention might be mentioned its ready attachability and detachability to a highly useful tool so that the latter may be made even more useful without in any way detracting from its essential characteristics and recognized usefulness.

I claim:

1. In an attachment for a conventional electric hand saw comprising the usual circular saw blade, motor, housing, grips, and base plate upon which the assembly slides during a cutting operation, the combination which includes an attachable plate member adapted to releasably engage the base plate of the conventional saw, a manual clamping member carried by the plate member adapted to releasably secure the attachable plate member to the base plate of the saw, a shoe member angularly disposed to the plate member, and secured thereto, adapted to place the saw blade in a plane parallel to and below the plane of the flat surface of the shoe, a manual control grip carried by the shoe, and lug members carried by the shoe and the attachable plate member adapted for sliding engagement with the edge of a building board as the shoe is slid over the side surface of the building board whereby to control the depth of the groove formed in the edge face of the building board by the saw.

2. In an attachment for an electrical hand saw comprising the usual circular saw blade, motor, housing, grips, and base plate upon which the assembly slides during a cutting operation, the combination which includes an attachable plate member adapted to releasably engage the bottom side of the base plate of the conventional saw, a manual clamping member carried by the attachable plate member adapted to releasably secure the attachable plate member to the base plate of the saw, a shoe member angularly disposed to and integral with the plate member adapted to place the saw blade parallel to but below the base of the shoe, a manual control grip carried by the shoe, and lug members carried by the shoe and attachable plate member adapted for sliding engagement with the edge of a building board as the shoe is slid over the side surface of the building board whereby to control the depth of the groove formed in the edge face of the board by the saw during operation of the latter.

3. In an attachment for an electrical hand saw comprising the usual circular saw blade, motor, housing, grips, and base plate upon which the assembly slides during a cutting operation, the combination which includes an attachable plate member adapted to releasably engage the bottom side of the base plate of the conventional saw, a manual clamping member carried by the attachable plate member adapted to releasably secure the latter to the base plate of the saw, an adjusting screw adapted to regulate the position of the attachable plate on the base plate of the saw, a shoe member angularly disposed and integral with the plate member adapted to place the saw blade parallel to but below the plane of the base of the shoe, a manual control grip carried by the shoe, overhanging stop lugs carried by the shoe and attachable plate member positioned to engage the edge of the building board in sliding relation as the shoe slides over the surface of the building board whereby to control the depth of the groove formed in the edge face of the board by the saw during the operation of the latter.

GEORGE H. BUGENHAGEN.

References Cited in the file of this patent

UNITED STATES PATENTS

| Number | Name | Date |
|---|---|---|
| 1,271,618 | Reese | July 9, 1918 |
| 1,413,395 | Donnelly | Apr. 18, 1922 |
| 1,700,683 | Madsen | Jan. 29, 1929 |
| 1,736,965 | Carter | Nov. 26, 1929 |
| 1,828,103 | De Witt | Oct. 20, 1931 |
| 1,883,392 | Moll | Oct. 18, 1932 |
| 1,885,087 | De Witt | Oct. 25, 1932 |
| 1,933,232 | Vaughan | Oct. 31, 1933 |
| 2,139,353 | Bruder | Dec. 6, 1938 |
| 2,273,160 | Tuck | Feb. 17, 1942 |
| 2,341,645 | Muench | Feb. 15, 1944 |
| 2,463,982 | Leau | Mar. 8, 1949 |
| 2,504,913 | Winebrenner | Apr. 18, 1950 |

FOREIGN PATENTS

| Number | Country | Date |
|---|---|---|
| 516,117 | Great Britain | Dec. 22, 1939 |